(12) United States Patent
Ito et al.

(10) Patent No.: US 6,917,166 B2
(45) Date of Patent: Jul. 12, 2005

(54) VEHICULAR LAMP

(75) Inventors: Masayasu Ito, Shizuoka-ken (JP); Shogo Sugimori, Shizuoka-ken (JP); Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/671,159

(22) Filed: Sep. 25, 2003

(65) Prior Publication Data

US 2004/0061450 A1 Apr. 1, 2004

(30) Foreign Application Priority Data

Oct. 1, 2002 (JP) ........................... 2002-289288

(51) Int. Cl.⁷ .............................. G05F 1/00; H02H 3/20
(52) U.S. Cl. ........................ 315/291; 315/307; 315/312; 361/91.1; 361/91.2; 362/800
(58) Field of Search ............................ 315/82, 77, 291, 315/307, 312, 324; 362/800, 802, 801, 806; 361/90, 91.1, 91.2, 93.7

(56) References Cited

U.S. PATENT DOCUMENTS

| 4,195,281 A | * | 3/1980 | Bell ........................... 340/458 |
| 6,396,466 B1 | * | 5/2002 | Pross et al. .................. 345/82 |
| 2003/0025465 A1 | * | 2/2003 | Swanson et al. ............ 315/291 |

FOREIGN PATENT DOCUMENTS

JP 10-217851 8/1998

OTHER PUBLICATIONS

English Abstract, Japanese Patent No. JP10217851 published Aug. 18, 1998, 1 pg.

* cited by examiner

Primary Examiner—Tuyet Thi Vo
(74) Attorney, Agent, or Firm—Osha Liang LLP

(57) ABSTRACT

A vehicular lamp used in a vehicle, includes: a light source including a light-emitting diode for emitting light in accordance with power received from a power supply provided in the outside of the vehicular lamp; a lamp body for accommodating the light source therein to protect the light source from water; and a breaking detection unit for detecting breaking of the light source and notifying the outside of the lamp body of the detection result.

10 Claims, 13 Drawing Sheets

VEHICULAR LAMP

This patent application claims priority from a Japanese patent application No. 2002-289288 filed on Oct. 1, 2002, the contents of which are incorporated herein by reference.

BACKGROUND OF THE INVENTION

1. Field of the Invention

The present invention relates to a vehicular lamp used in a vehicle.

2. Description of the Related Art

Conventionally, a vehicular lamp that uses a filament bulb as a light source is known. In this type of lamp, breaking of the light source was detected by measuring impedance of the lamp, for example. Moreover, a breaking detection device for an automotive lamp is conventionally known that is used as a multiple light brake light and the like as disclosed, for example, in Japanese Patent Application Laid-Open No. 10-217851, pages 3–4, FIGS. 1–3.

However, in a case where a light-emitting diode is used as the light source, a lighting circuit having large impedance may be used because the light-emitting diode can emit light by a smaller current value as compared to the filament bulb. In this case, the impedance of the lamp is large even if the light source is not broken. Thus, according to the conventional technique, the braking of the light source was not detected appropriately in some cases.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a vehicular lamp used in a vehicle, comprises: a light source including a light-emitting diode operable to emit light in accordance with power received from a power supply provided in an outside of the vehicular lamp; a lamp body operable to accommodate the light source therein to protect the light source from water; and a breaking detection unit operable to detect breaking of the light source and notify an outside of the lamp body of the detection result.

A plurality of light sources connected in parallel maybe provided in the vehicular lamp, and the breaking detection unit may detect the breaking in a case where at least one of the plurality of light sources was broken.

The breaking detection unit may notify the outside of the lamp body of information indicating the breaking via a breaking information notifying line that is electrically independent of a power transmission line for transmitting the power to the light sources.

The vehicular lamp may further comprise an impedance changing unit operable to change impedance between two power transmission lines for transmitting the power to the light source in a case where the breaking detection unit detected the breaking, wherein the breaking detection unit notifies the outside of the lamp body of information indicating the breaking by making the impedance changing unit change the impedance.

The impedance changing unit may include: a switch connected in parallel to the light source; and a resistor, connected in parallel to the light source and in series with the switch, operable to allow a transmission-line current that is a current from one of the two power transmission lines to the other power transmission line in a case where the switch is turned on, and the breaking detection unit may turn the switch on to allow the transmission-line current to flow in the resistor in a case where the breaking detection unit detected the breaking, thereby making the impedance changing unit change the impedance to a smaller value.

The light source may receive the power that intermits at a predetermined period; the breaking detection unit may detect the breaking during a time period in which the light source receives the power; and the impedance changing unit may further includes a limiting capacitor operable to limit a time in which the impedance is smaller than a predetermined value by changing the transmission-line current during the time period in a case where the breaking detection unit detected the breaking.

The light source may receive the power that intermits at a predetermined period; the breaking detection unit may detect the breaking during a time period in which the light source receives the power; the vehicular lamp may further include a holding capacitor operable to hold a value indicating whether or not the breaking detection unit detected the breaking, during a time period in which the light source receives no power; and the breaking detection unit may notify the outside of the lamp body of information indicating the breaking based on the value held by the holding capacitor during the time period in which the light source receives no power.

The vehicular lamp may further comprise an impedance changing unit operable to change impedance between two power transmission lines for transmitting the power to the light source, based on the value held by the holding capacitor during the time period in which the light source receives no power, wherein the breaking detection unit notifies the outside of the lamp body of the information indicating the breaking by making the impedance changing unit change the impedance.

The vehicular lamp may further comprise a held value outputting unit operable to output the value held by the holding capacitor to the outside of the lamp body during the time period in which the light source receives no power, wherein the breaking detection unit notifies the outside of the lamp body of the information indicating the breaking by making the held value outputting unit output the value.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
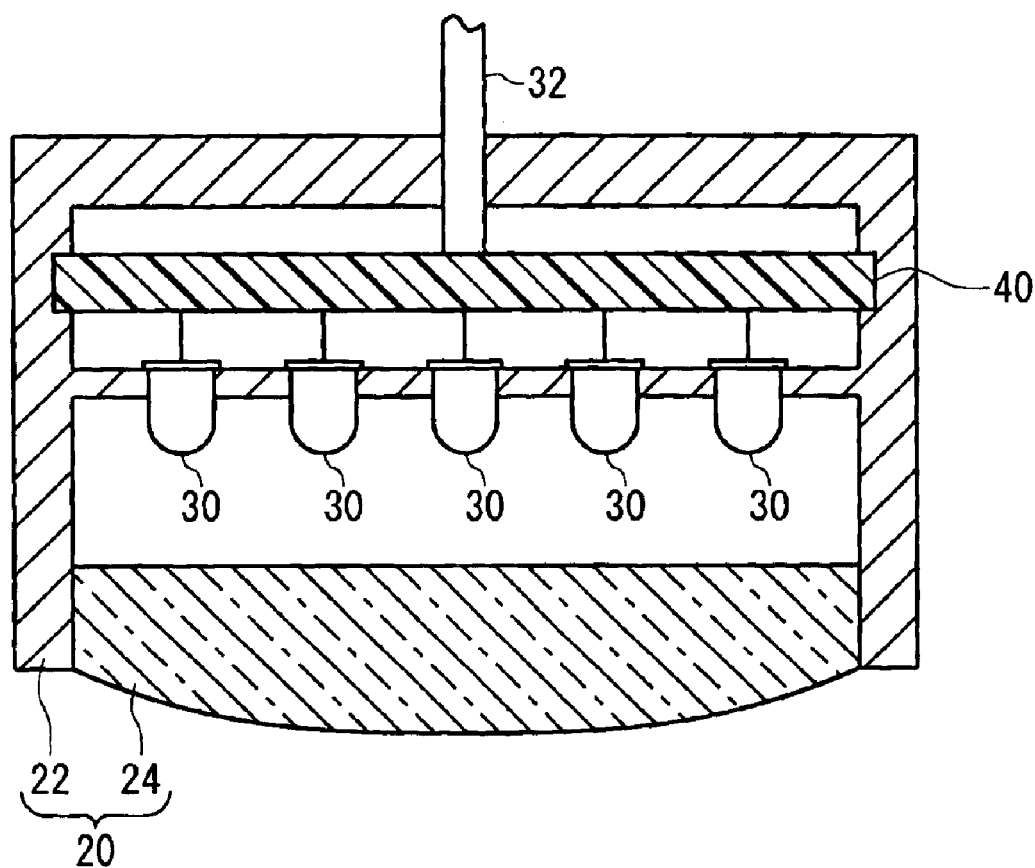
FIG. 1 shows an example of cross-section of a vehicular lamp according to an embodiment of the present invention.

FIG. 1 shows an example of cross-section of a vehicular lamp 10 according to the first embodiment of the present invention. The vehicular lamp 10 is provided in a body of a vehicle such as a car, and used as a stop lamp, taillight, turn signal and the like. The vehicular lamp 10 of the present embodiment notifies to the outside of a lamp body 20 of information indicating breaking of a light source 30.

The vehicular lamp 10 includes the lamp body 20, a circuit board 40, a plurality of light sources 30 and a wiring 32. The lamp body 20 includes a transmitting part 24 that transmits light generated by the light sources 30 and a holder 22 for accommodating the circuit board 40 and a plurality of light sources 30 therein. The transmitting part 24 may be a lens that can diffuse or converge the light generated by the light sources 30. The lamp body 20 has a function of protecting the light sources 30 and the circuit board 40 from water. That is, the lamp body 20 seals the light sources 30 and the circuit board 40 therein. Moreover, the lamp body 20 may have an opening. In this case, when the lamp body 20 is attached to the body of the vehicle, the opening is blocked thereby sealing and protecting the light sources 30 and the circuit board 40 from water.

The light sources 30 emit light by power given thereto. In the present embodiment, the light sources 30 are light-emitting diodes. The circuit board 40 controls the power supplied to the light sources 30. To the circuit board 40, power is supplied from an external power supply via the wiring 32. The circuit board 40 adjusts the thus supplied power and then supplies the adjusted power to the light sources 30. In the present embodiment, a battery for a vehicle such as a car serves as the above-mentioned external power supply. Although the vehicular lamp 10 includes a plurality of light sources 30 in this example, the vehicular lamp 10 may include a single light source 30 in an alternative example.

Figure 2:
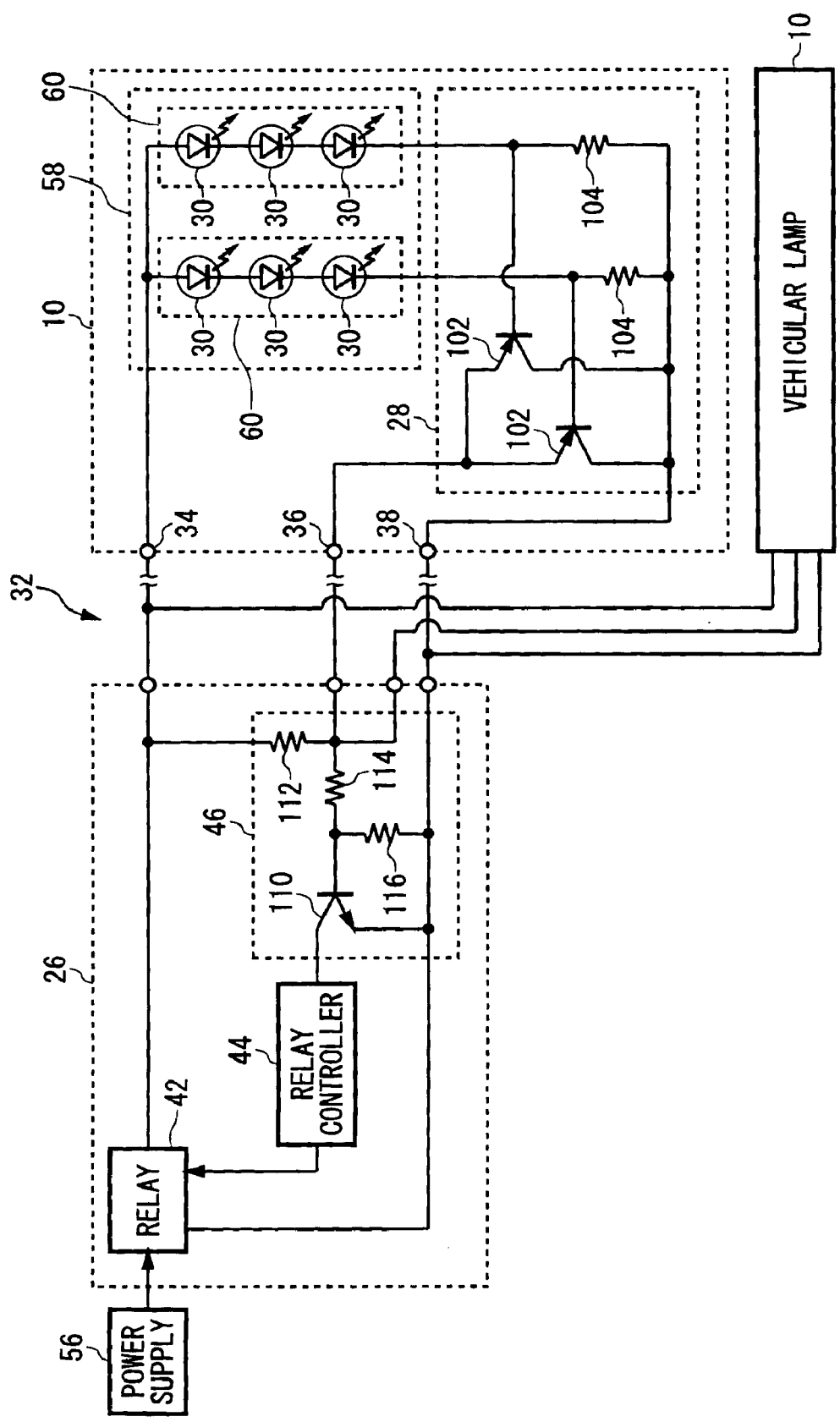
FIG. 2 shows an exemplary circuit structure of the vehicular lamp and flasher-relay unit.

FIG. 2 shows an exemplary circuit structure of the vehicular lamp 10 and flasher-relay unit 26 for supplying power to the vehicular lamp 10. The vehicular lamp 10 and the flasher-relay unit 26 are electrically connected via the wiring 32. The wiring 32 includes two power transmission lines that transmit the power from the flasher-relay unit 26 to the light source 30 and a breaking-information notifying line that is electrically independent of the power transmission lines.

The vehicular lamp 10 receives a positive voltage from the flasher-relay unit 26 via a terminal 34 electrically connected to one of the power transmission lines, and is electrically connected to the ground potential of the flasher-relay unit 26 via a terminal 38 electrically connected to the other power transmission line. Moreover, the vehicular lamp 10 detects the breaking of the light source 30, and sends information indicative of that breaking to the flasher-relay unit 26 provided in the outside of the lamp body 20 (see FIG. 1) via a terminal 36 electrically connected to the breaking-information notifying line.

The vehicular lamp 10 includes a light source block 58 and a breaking detection unit 28 connected in series with the light source block 58. The light source block 58 includes a plurality of light source units 60 connected in parallel by being electrically connected to the terminal 34 at their one ends. Each of the light source units 60 includes one or more light sources 30 connected in series.

The breaking detection unit 28 includes a plurality of resistors 104 and a plurality of PNP transistors 102 that are provided on the circuit board 40 (see FIG. 1) to correspond to a plurality of light source units 60, respectively. The resistor 104 gives a voltage based on a current flowing in the corresponding light source unit 60 to a base terminal of the corresponding PNP transistor 102.

In a case where any one of the light sources 30 has been broken, a current does not flow in the corresponding resistor 104. Thus, the corresponding PNP transistor 102 is turned on to sink the collector current received from the terminal 36 to the ground. In this manner, the breaking detection unit 28 detects the braking in a case where at least one of a plurality of light sources has been broken, and notifies the flasher-relay unit 26 of the breaking information indicating the presence or absence of breaking via the terminal 36.

On the other hand, in a case where no light source 30 is broken, the current that flows in the light source unit 60 flows in the corresponding resistor 104 and therefore the PNP transistor 102 is turned off. According to this example, it is possible to appropriately detect the breaking of the light source 30 and appropriately notify the flasher-relay unit 26 of the detection result.

The flasher-relay unit 26 turns a plurality of light sources 30 on and off by supplying power that intermits at a predetermined period to the vehicular lamp 10. In this example, the flasher-relay unit 26 supplies the power based on DC power received from a power supply 56 that is a battery of a vehicle, for example, to two vehicular lamps 10 that are right and left turn signals of the vehicle, for example. The power supply 56 further supplies the power to a controlling device for controlling the engine of the vehicle, an interior light provided in the room of the vehicle, and the like.

The flasher-relay unit 26 includes a relay 42, a relay controller 44 and a breaking-information receiving unit 46. The relay 42 causes the DC power received from the power supply 56 to intermit at a predetermined period so as to supply the intermitting power to the vehicular lamp 10 via two power transmission lines.

The breaking-information receiving unit 46 includes an NPN transistor 110, a resistor 112, a resistor 114 and a resistor 116. The base terminal of the NPN transistor 110 is electrically connected to the breaking detection unit 28 via the resistor 114.

The resistor 112 is a pull-up resistor provided at the input end of the breaking-information receiving unit 46. In a case where the breaking detection unit 28 detected no breaking of the light source 30, the resistors 112, 114 and 116 supply a voltage obtained by dividing a positive voltage output from the flasher-relay unit 26 by a resistance ratio of these resistors, to the base terminal of the NPN transistor 110, thereby keeping the NPN transistor 110 on. In this case, the NPN transistor 110 sinks the collector current received from the relay controller 44 to the ground potential.

On the other hand, in a case where the breaking detection unit 28 detected the breaking of the light source 30, the NPN transistor 110 is turned off. Thus, the breaking-information receiving unit 46 transmits the breaking information received from the breaking detection unit 28 to the relay controller 44. Please note that the NPN transistor 110 is turned on in a case where the breaking detection unit 28 of either one of the vehicular lamps 10 detected, and transmits the breaking information to the relay controller 44. According to this example, the flasher-relay unit 26 can detect the breaking of the light source 30 precisely.

The relay controller 44 changes the intermitting period of the relay 42 in accordance with the output of the breaking-information receiving unit 46. In this example, the relay controller 44 shortens the intermitting period of the relay 42 in a case where the breaking was detected. In this case, a driver of a vehicle and the like can find the presence or absence of breaking of the light source 30 by observing the period at which the light source 30 goes on and off.

In an alternative embodiment, an indicator LED (light-emitting diode) that indicates the state in which the light source 30 goes on and off may be provided on a control panel of the vehicle, the indicator LED being driven by the flasher-relay unit 26. In this case, the driver of the vehicle and the like can find the presence or absence of the breaking 30 more easily.

If the flasher-relay unit 26 detects the breaking of the light source 30, for example, based on the consumed power of the vehicular lamp 10, it is necessary to provide a current detector for detecting the consumed current in the flasher-relay unit 26. Such a current detector can detect the breaking of the light source 30 by comparing the consumed current of the vehicular lamp 10 with a predetermined threshold current.

The vehicular lamp 10 including the light-emitting diode, however, consumes a current in accordance with the number of parallel connections and/or serial connections of the light-emitting diodes. Therefore, in the above case, it is necessary to use the current detector having a different threshold current value depending on the type of the vehicular lamp 10. This makes it difficult to normalize the flasher-relay unit 26.

On the other hand, the flasher-relay unit 26 in this example can detect the breaking of the light source 30 without using the consumed current of the vehicular lamp 10. Thus, according to the this example, it is possible to provide a plurality of types of vehicular lamp 10 that have different consumed powers for one type of flasher-relay unit 26. In addition, this makes it possible to normalize the flasher relay for driving a turn signal of a vehicle.

Figure 3:
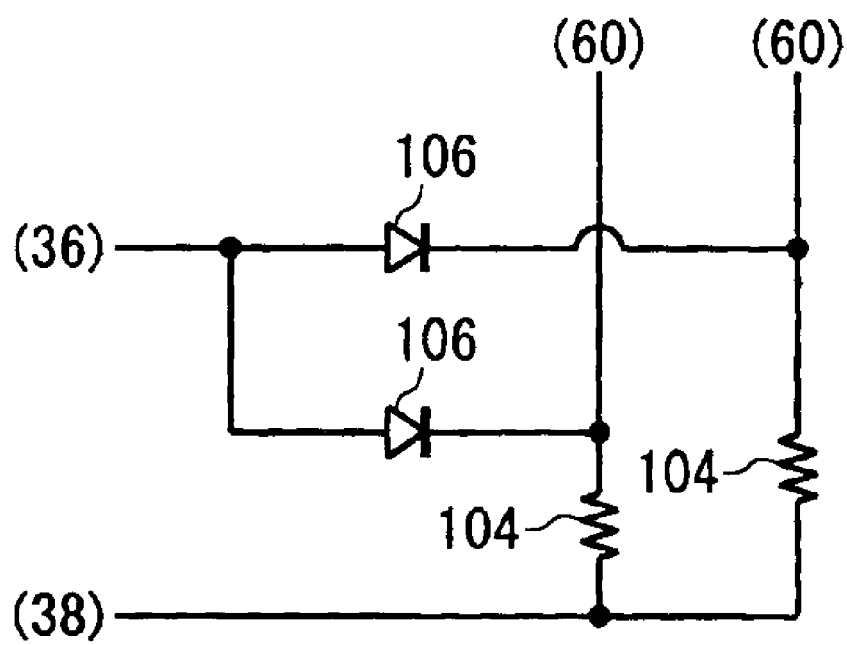
FIG. 3 shows another exemplary circuit structure of a breaking detection unit.

FIG. 3 shows another exemplary circuit structure of the breaking detection unit 28. In this example, the breaking detection unit 28 includes a plurality of diodes 106 in place of a plurality of PNP transistors 102. In this example, in a case where any one of the light sources 30 was broken, the corresponding resistor 104 lowers the potential at the cathode of the corresponding diode 106. Thus, the corresponding diode 106 is biased in the forward direction and sinks the current received from the terminal 36 to the ground potential. Also in this case, it is possible to appropriately detect the breaking of the light source 30 and appropriately notify the flasher-relay unit 26 of the detection result.

Figure 4:
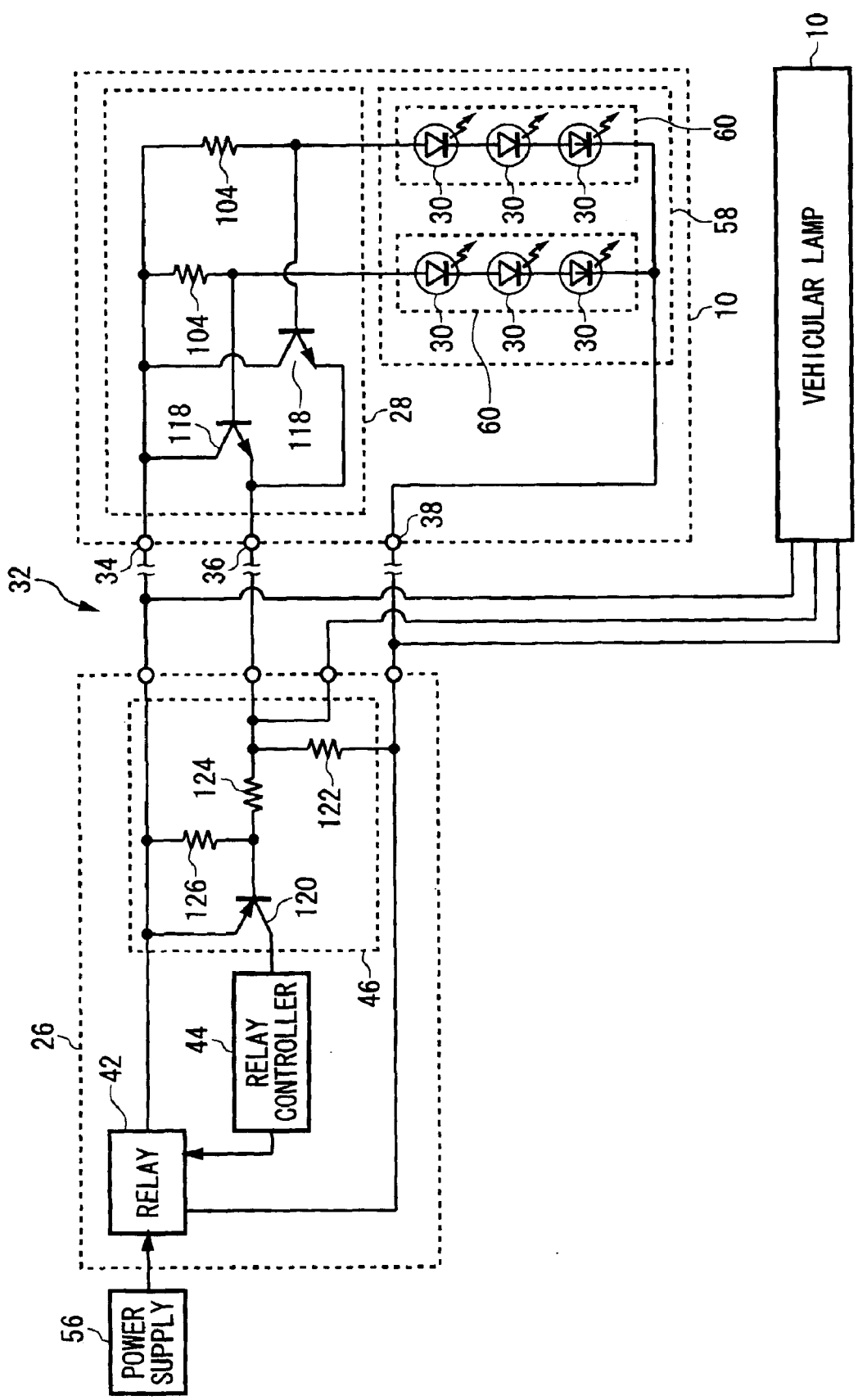
FIG. 4 shows another exemplary circuit structure of the vehicular lamp and flasher-relay unit.

FIG. 4 shows another example of the circuit structure of the vehicular lamps 10 and the flasher-relay unit 26. In FIG. 4, the components labeled with the same reference numerals as those in FIG. 2 have the same or similar functions as/to the components in FIG. 2 and therefore the description thereof is omitted.

In this example, a plurality of light source units 60 are connected in parallel by being electrically connected to the terminal 38 at their one ends. The breaking detection unit 28 includes a plurality of NPN transistors 118 in place of a plurality of PNP transistors 102. In a case where any one of the light sources 30 was broken, the corresponding NPN transistor 118 is turned on and sources the collector current to the terminal 36. In this manner, also in this example, it is possible to appropriately detect the breaking of the light source 30 and appropriately notify the flasher-relay unit 26 of the detection result.

Moreover, in this example, the detection-information receiving unit 46 includes a PNP transistor 120, a resistor 122, a resistor 124 and a resistor 126. The base terminal of the PNP transistor 120 is electrically connected to the breaking detection unit 28 via the resistor 124.

The resistor 122 is a pull-down resistor provided at the input end of the breaking-information receiving unit 46. In a case where no breaking was detected, the resistors 126, 124 and 122 supply a voltage obtained by dividing a positive voltage output from the flasher-relay unit 26 by a resistance ratio of these resistors, to the base terminal of the PNP transistor 120, thereby keeping the PNP transistor 120 on. Moreover, the NPN transistor 110 is turned off when the breaking has been detected. In this manner, the breaking-information receiving unit 46 transmits the breaking information received from the breaking detection unit 28 to the relay controller 44. Also in this example, the flasher-relay unit 26 can detect the breaking of the light source 30 precisely.

Figure 5:
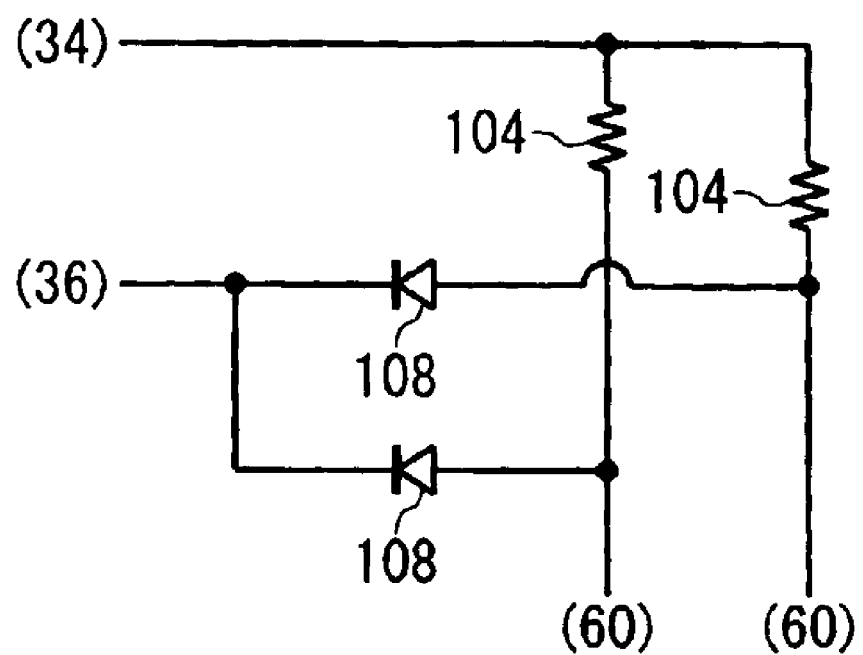
FIG. 5 shows another exemplary circuit structure of a breaking detection unit.

FIG. 5 shows another example of the circuit structure of the breaking detection unit 28 in the vehicular lamp 10 described referring to FIG. 4. In this example, the breaking detection unit 28 includes a plurality of diodes 106 in place of a plurality of NPN transistors 118. In this example, in a case where any one of the light sources 30 has been broken, the corresponding resistor 104 increases the potential at the anode of the corresponding diode 106. Thus, the corresponding diode 106 is biased in the forward direction and sources the current received from the terminal 34 to the terminal 36. Also in this case, it is possible to appropriately detect the breaking of the light source 30 and appropriately notify the flasher-relay unit 26 of the detection result.

Figure 6A:
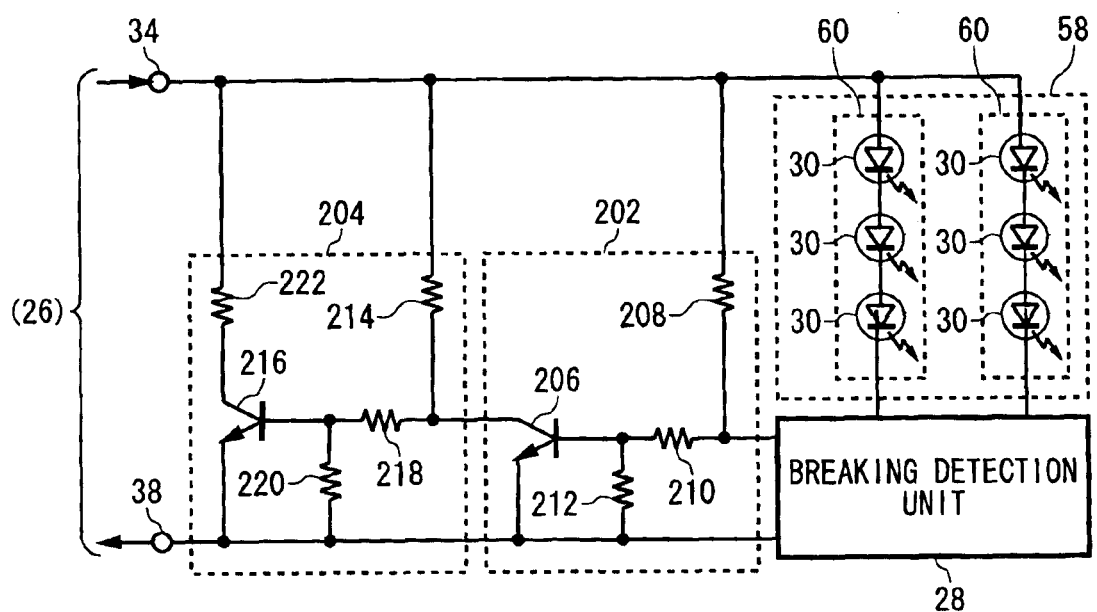
FIG. 6A shows an exemplary circuit structure of the vehicular lamp.
Figure 6B:
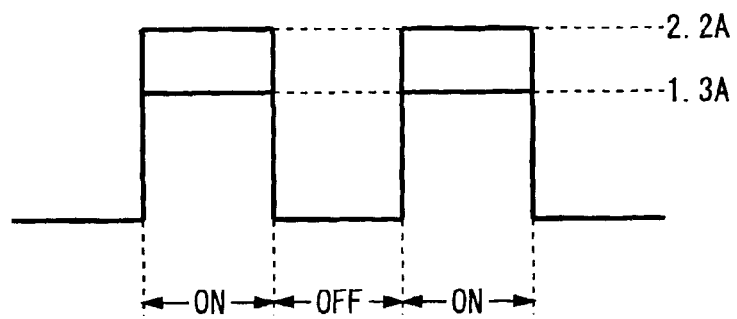
FIG. 6B shows an example of a current consumed by a resistor.

FIGS. 6A and 6B show an exemplary structure of the vehicular lamp 10 according to the second embodiment of the present invention. FIG. 6A shows an exemplary circuit structure of the vehicular lamp 10. The vehicular lamp 10 in this example changes transmission-line impedance that is impedance between two power transmission lines that are electrically connected to terminals 34 and 36, respectively, thereby notifying a flasher-relay unit 26 provided in the outside of a lamp body 20 (see FIG. 1) of information indicating breaking of a light source 30.

In the present embodiment, the vehicular lamp 10 includes a light source block 58, a breaking detection unit 28, an output transmission unit 202 and an impedance changing unit 204. In FIG. 6, the components labeled with the same reference numerals as those in FIG. 2 have the same or similar functions as/to the components in FIG. 2 and therefore the description thereof is omitted.

In the present embodiment, the vehicular lamp 10 receives power from the flasher-relay unit 26 having a function of measuring the transmission-line impedance in place of the flasher-relay unit 26 described referring to FIG. 2. The description of such a circuit for detecting impedance is omitted because various types of circuit are known as such a circuit. In this example, the flasher-relay unit 26 detects the breaking of the light source 30 in a case where the transmission-line impedance is smaller than a predetermined value.

The output transmission unit 202 includes an NPN transistor 206, a resistor 208, a resistor 210 and a resistor 212. The NPN transistor 206 and the resistors 208, 210 and 212 have the same or similar functions as/to those of the NPN transistor 110 and the resistors 112, 114 and 116 in the breaking-information receiving unit 46 (see FIG. 2), respectively. Thus, the output transmission unit 202 has the same or similar function as/to that of the breaking-information receiving unit 46, and transmits the breaking information received from the breaking detection circuit 28 to the impedance changing unit 204 in the next stage. Please note that the NPN transistor 206 is turned on in a case where no breaking has been detected, so as to source the collector current to the ground potential. Moreover, the NPN transistor 206 is turned off in a case where the breaking has been detected.

The impedance changing unit 204 includes an NPN transistor 216, a resistor 222, a resistor 214, a resistor 218 and a resistor 220. The NPN transistor 216 is an exemplary switch connected in parallel to the light source 30. The base terminal of the NPN transistor 216 is electrically connected via the resistor 218 to the collector terminal of the NPN transistor 206 that is an output end of the output transmission unit 202. The collector terminal of the NPN transistor 216 is electrically connected to the terminal 34 via the resistor 222, while the emitter terminal thereof is grounded. Moreover, an end of the resistor 218, that is close to the NPN transistor 216, is grounded via the resistor 220 and the other end thereof is electrically connected to the terminal 34 via the resistor 214.

The resistor 222 is connected to the light source 30 in parallel and is also connected to the NPN transistor 216 in series. The resistor 222 allows a transmission-line current, that is a current from one of the power transmission lines to the other power transmission line, to flow therethrough in a case where the NPN transistor 216 is turned on, thereby supplying the collector current to the NPN transistor 216.

In a case where no breaking has been detected, since the NPN transistor 206 sinks the collector current, the NPN transistor 216 is turned off. In this case, the transmission-line impedance is large because the resistor 222 does not allow the transmission-line current to flow therethrough.

On the other hand, in a case where the breaking has been detected, since the NPN transistor 206 is turned off, the resistors 214, 218 and 220 supply a voltage obtained by dividing a positive voltage output from the flasher-relay unit 26 by a resistance ratio of these resistors to the base terminal of the NPN transistor 216. Thus, the NPN transistor 216 is turned on and sinks the collector current received from the resistor 222 to the ground, thereby making the transmission-line current flow in the resistor 222.

In this manner, the impedance changing unit 204 changes the transmission-line impedance to a smaller value in a case where the breaking has been detected. According to this example, the breaking detection unit 28 can notify the flasher-relay unit 26 of the information indicative of the breaking by making the impedance changing unit 204 change the transmission-line impedance.

FIG. 6B shows an example of consumed current of the resistor 222 in a case where the breaking has been detected. In this example, the light source 30 goes on and off by receiving the power intermitting at a predetermined period. Thus, the current consumed by the resistor 222 increases during an ON period in which the light source 30 goes on and becomes substantially zero during an OFF period in which the light source 30 does not go on.

In this example, the breaking detection unit 28 detects the breaking during a period in which the light source 30 receives the power. The flasher-relay unit 26 can detect the breaking of the light source 30 by detecting the consumed current of the vehicular lamp 10 during that period.

In addition, in this example, the consumed current of the vehicular lamp 10 in a case where the breaking has been detected largely changes from the consumed current in a case where no breaking has been detected. Thus, according to this example, the flasher-relay unit 26 can detect the breaking with higher precision irrespective of the consumed current of the light source 30. Therefore, according to this example, it is possible to normalize the flasher-relay.

In a case where the breaking was detected, the vehicular lamp 10 consumes a current that is about twice the current when the vehicular lamp 10 operates normally, for example. In this case, the flasher-relay unit 26 can detect the breaking of the light source 30 with high precision. For example, assuming that the vehicular lamp 10 consumes a current of 1.8 A in the normal operation, the vehicular lamp 10 in the case where the breaking was detected consumes a current of 3.6 A. In this case, assuming that a current consumed by the components in the vehicular lamp 10 other than the resistor 222 is reduced to, for example, about 1.4 A by the breaking of one light source 30, the resistor 222 consumes a current of about 2.2 A in a case where the breaking was detected.

Moreover, in a case where the breaking was detected, the vehicular lamp 10 may consume a current that is approximately 1.5 times the current when the vehicular lamp 10 operates normally. In this case, the consumed current of the vehicular lamp 10 in the case where the breaking was detected can be reduced. Also, in this case, the resistor 222 may consume a current of about 1.3 A in the case where the braking was detected.

Figure 7A:
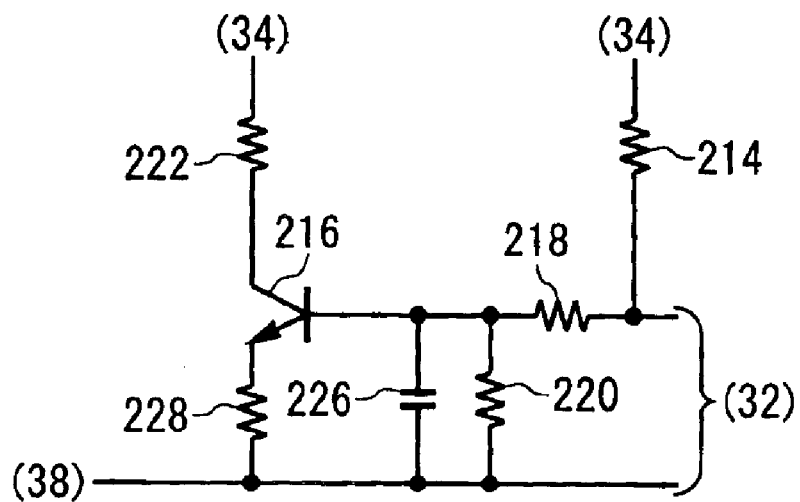
FIG. 7A shows another exemplary circuit structure of an impedance changing unit.

FIG. 7A shows a circuit structure of the impedance changing unit 204. In FIG. 7A, the components labeled with the same reference numerals as those in FIG. 6A have the same or similar functions as/to the components in FIG. 6A and therefore the description thereof is omitted.

In this example, the impedance changing unit 204 includes a capacitor 226 for grounding the base terminal of the NPN transistor 216. The capacitor 226 changes the base voltage of the NPN transistor 216 to gradually increase in a case where the breaking has been detected during a time period in which the light source 30 receives the power (hereinafter, referred to as a power-supply ON period), thereby changing the transmission-line current to gradually increase.

In this manner, the capacitor 226 limits a time in which the transmission-line current is larger than a predetermined reference current. In other words, during the power-supply ON period, the capacitor 226 limits a time period in which the transmission-line impedance is smaller than a predetermined value.

Figure 7B:
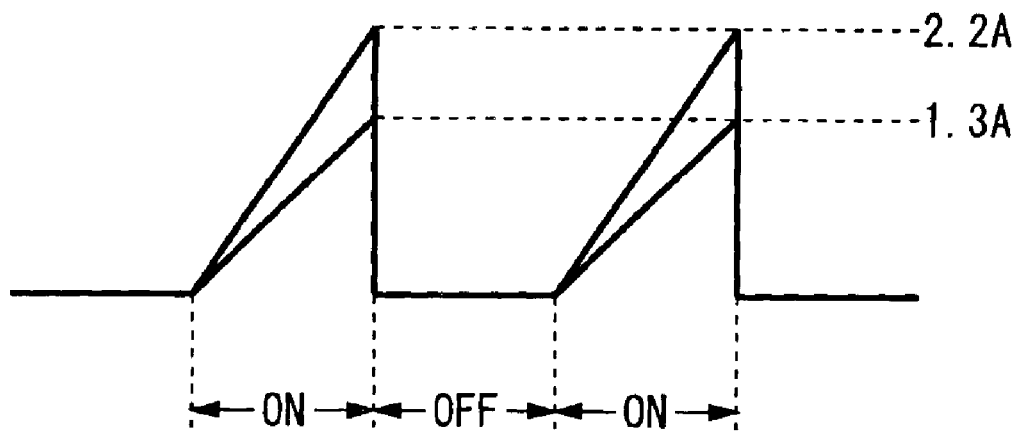
FIG. 7B shows an example of the current consumed by the resistor in the impedance changing unit in FIG. 7A.

FIG. 7B shows an example of the consumed current of the resistor 222 in a case where the breaking has been detected. In this example, the resistor 222 consumes the transmission-line current that gradually increases during the power-supply ON period. That is, at a time immediately after the light source 30 received the power, the current consumed by the resistor 222 is small. Thus, according to this example, the power consumed by the resistor 222 can be reduced. Also in this case, the size of the vehicular lamp 10 can be reduced because heat generation in the resistor 222 is reduced.

In a case where the current to be supplied to the vehicular lamp 10 is larger than a predetermined upper limit, it is preferable that the flasher-relay unit 26 stop the supply of power to the vehicular lamp 10 so as to turn the light source 30 off. Moreover, the flasher-relay unit 26 may make the power to be supplied to the vehicular lamp 10 intermit at a short period determined based on the aforementioned upper limit and an increasing slope of the transmission-line current.

Figure 8A:
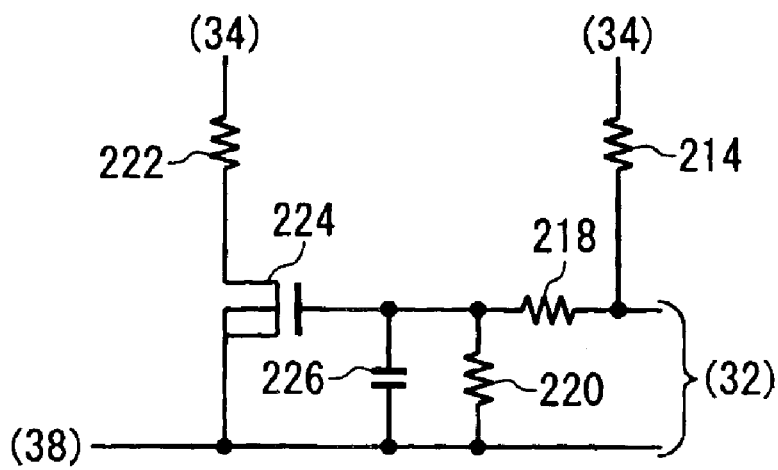
FIG. 8A shows still another exemplary circuit structure of the impedance changing unit.

FIG. 8A shows another exemplary circuit structure of the impedance changing unit 204. In FIG. 8A, the components labeled with the same reference numerals as those in FIG. 7A have the same or similar functions as/to the components in FIG. 7A and therefore the description thereof is omitted.

In this example, the impedance changing unit 204 includes an NMOS transistor 224 in place of the NPN transistor 216. In this case, the capacitor 226 changes the gate voltage of the NMOS transistor 224 to gradually increase. In a case where the gate voltage of the NMOS transistor 224 becomes larger than a predetermined threshold value, the NMOS transistor 224 is turned on and allows the transmission-line current to flow in the resistor 222. Thus, the impedance between two power transmission lines is changed to a smaller value.

Figure 8B:
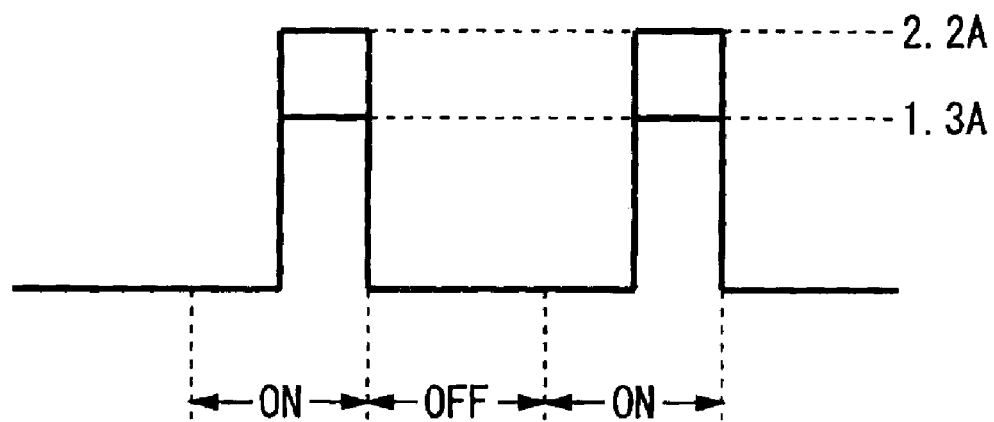
FIG. 8B shows an example of the current consumed by the resistor in the impedance changing unit in FIG. 8A.

FIG. 8B shows an exemplary current consumed by the resistor 222 in a case where the breaking has been detected. In this example, the resistor 222 consumes the transmission-line current after the gate voltage of the NMOS transistor 224 has become larger than the predetermined threshold value. That is, the current consumed by the resistor 222 is approximately zero immediately after the light source 30 has received the power. Thus, according to this example, the power consumed by the resistor 222 can be reduced.

Figure 9A:
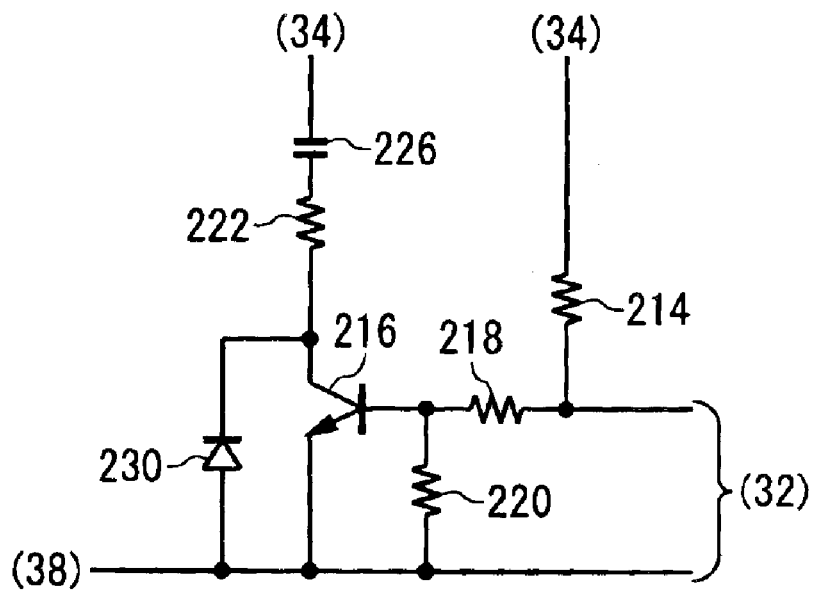
FIG. 9A shows still another exemplary circuit structure of the impedance changing unit.

FIG. 9A shows another exemplary circuit structure of the impedance changing unit 204. In FIG. 9A, the components labeled with the same reference numerals as those in FIG. 7A have the same or similar functions as/to the components in FIG. 7A and therefore the description thereof is omitted.

In this example, the impedance changing unit 204 further includes a diode 230 having an anode that is grounded and a cathode that is electrically connected to the collector terminal of the NPN transistor 216. Moreover, the resistor 222 is electrically connected to the terminal 34 via the capacitor 226.

In a case where the breaking has been detected, the capacitor 226 accumulates electric charges that accompany the transmission-line current flowing in the resistor 222, thereby changing the transmission-line current to gradually decrease. In this manner, the capacitor 226 limits the time in which the transmission-line impedance is smaller than a predetermined value during the power-supply ON period. The diode 230 discharges the capacitor 226 during a time period in which the light source 30 receives no power (hereinafter, referred to as a power-supply OFF period).

Figure 9B:
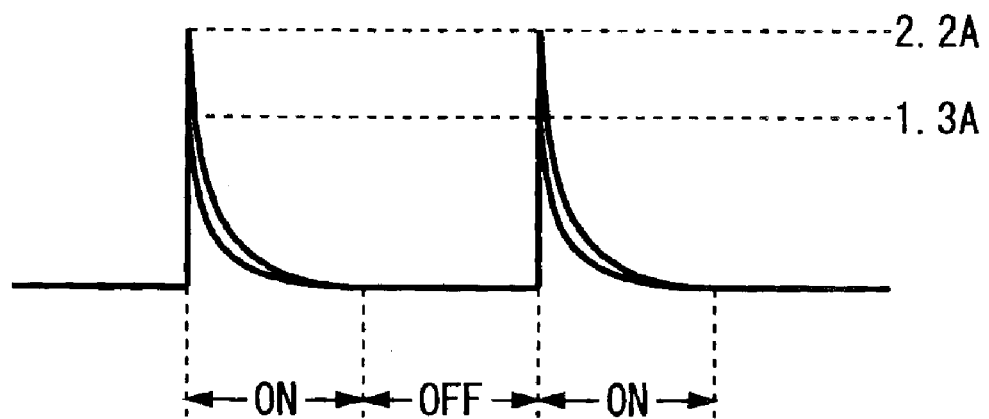
FIG. 9B shows an example of the current consumed by the resistor in the impedance changing unit in FIG. 9A.

FIG. 9B shows an exemplary current consumed by the resistor 222 in this example in a case where the breaking has been detected. During the power-supply ON period, the capacitor 226 changes the impedance between two power transmission lines to the smallest value at the beginning of the power-supply ON period and then changes that impedance to gradually increase. Thus, the resistor 222 consumes the transmission-line current that gradually decreases. It is preferable that the capacitor 226 make the transmission-line current flow during a time period in which the flasher-relay unit 26 measures the transmission-line impedance and then lower the transmission-line current to substantially zero. According to this example, the power consumed by the resistor 222 can be reduced.

Figure 10A:
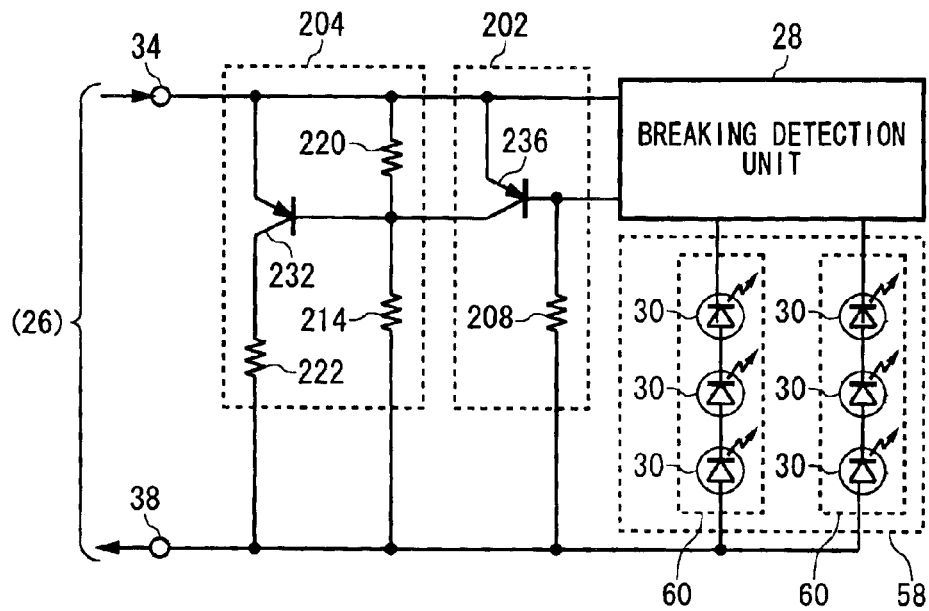
FIG. 10A shows still another exemplary circuit structure of the vehicular lamp.

FIGS. 10A–10D show other exemplary structures of the vehicular lamp 10. FIG. 10A shows the circuit structure of the vehicular lamp 10. In this example, the vehicular lamp 10 includes a breaking detection unit 28, a light source block 58, an output transmission unit 202 and an impedance changing unit 204. The breaking detection unit 28 and the light source block 58 have the same or similar functions as/to the breaking detection unit 28 and the light source block 58 described referring to FIG. 4 and therefore the description thereof is omitted. The vehicular lamp 10 receives power from a flasher-relay unit 26 that has the same or similar function as/to the flasher-relay unit 26 for supplying the power to the vehicular lamp 10 described referring to FIGS. 6A and 6B.

The output transmission unit 202 includes a PNP transistor 236 and a resistor 208. The PNP transistor 236 and the resistor 208 have the same or similar functions as/to the functions of the PNP transistor 120 and resistor 122 in the breaking-information receiving unit 46 (see FIG. 4), respectively. Thus, the output transmission unit 202 has the same or similar function as that of the breaking-information receiving unit in FIG. 4, and transmits the breaking information received from the breaking detection unit 28 to the impedance changing unit 204 in the next stage. Moreover, the PNP transistor 236 is turned on in a case where no breaking has been detected and is turned off in a case where the breaking has been detected.

The impedance changing unit 204 includes a PNP transistor 232, a resistor 222, a resistor 214 and a resistor 220. The base terminal and the emitter terminal of the PNP transistor 120 are electrically connected to the collector terminal of the PNP transistor 236 and the terminal 34, respectively. The collector terminal of the PNP transistor 120 is grounded via the resistor 222.

Thus, the PNP transistor 232 is turned on in a case where the breaking has been detected and makes the transmission-line current flow in the resistor 222 so as to change the transmission-line impedance to a smaller value. According to this example, the breaking detection unit 28 can notify the flasher-relay unit 26 of the information indicating the breaking by making the impedance changing unit 204 change the transmission-line impedance.

Figure 10B:
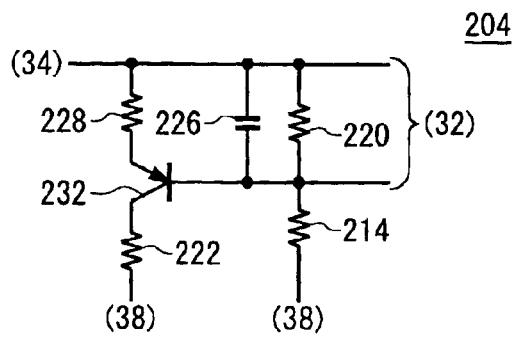
FIG. 10B shows another exemplary circuit structure of the impedance changing unit.

FIG. 10B shows another exemplary circuit structure of the impedance changing unit 204. The impedance changing unit 204 in this example further includes a capacitor 226 that has the same or similar function as/to that of the capacitor 226 described referring to FIG. 7A. The capacitor 226 electrically connects the base terminal of the PNP transistor 232 to the terminal 34 and, during the power-supply ON period in a case where the breaking has been detected, changes the base voltage of the NPN transistor 216 to gradually decrease, thereby changing the transmission-line current to gradually increase. According to this example, the power consumed by the resistor 222 can be reduced.

Figure 10C:
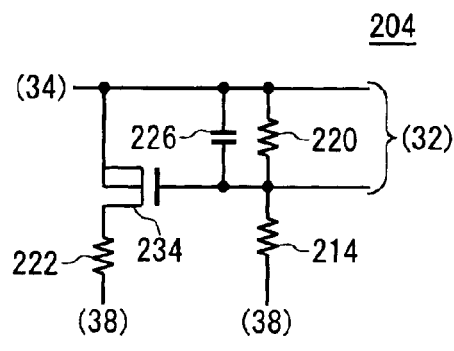
FIG. 10C shows still another exemplary circuit structure of the impedance changing unit.

FIG. 10C shows still another exemplary circuit structure of the impedance changing unit 204. In this example, the impedance changing unit 204 includes a PMOS transistor 234 in place of the PNP transistor 232. The capacitor 226 has the same or similar function as/to that of the capacitor 226 described referring to FIG. 8A. The PMOS transistor 234 is turned on when the gate voltage thereof is smaller than a predetermined threshold value. The capacitor 226 changes the gate voltage of the PMOS transistor 234 to gradually decrease. According to this example, the power consumed by the resistor 222 can be reduced.

Figure 10D:
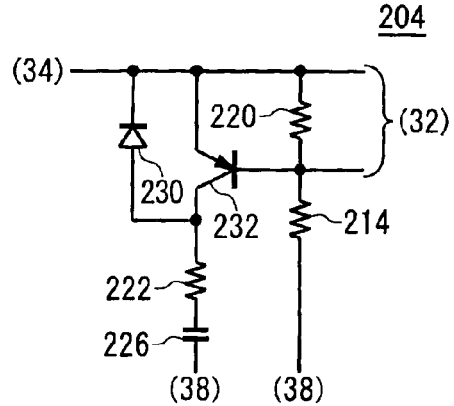
FIG. 10D shows still another exemplary circuit structure of the impedance changing unit.

FIG. 10D shows still another exemplary circuit structure of the impedance changing unit 204. In this example, the impedance changing unit 204 further includes a diode 230 having a cathode electrically connected to the terminal 34 and an anode electrically connected to the collector terminal of the PNP transistor 232. The resistor 222 is electrically connected to the terminal 38 via the capacitor 226. In this example, the capacitor 226 and the diode 230 have the same or similar functions as/to those of the capacitor 226 and the diode 230 in FIG. 9A. According to this example, the power consumed by the resistor 222 can be reduced. It should be noted the components in FIGS. 10B–10D labeled with the same reference numerals as those in FIG. 10A may have the same or similar functions as/to the components in FIG. 10A.

Figure 11:
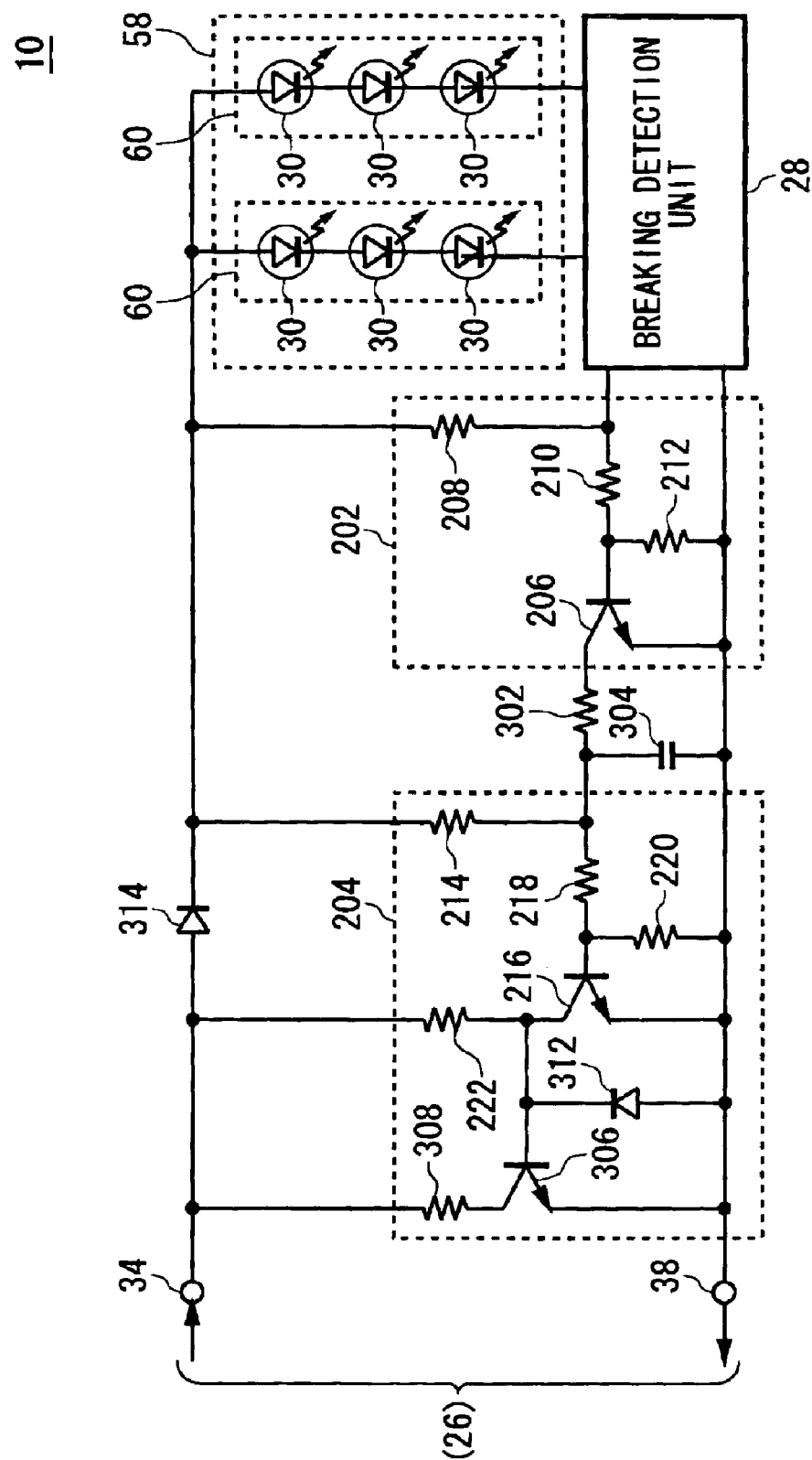
FIG. 11 shows still another exemplary circuit structure of the vehicular lamp.

FIG. 11 shows still another exemplary circuit structure of the vehicular lamp 10. In this example, the vehicular lamp 10 receives power from a flasher-relay unit 26 having a function of measuring the transmission-line impedance that is impedance between the transmission lines in place of the flasher-relay unit 26 described referring to FIG. 2. The description of such a circuit for detecting the impedance is omitted because various types of circuit are known as such a circuit. In this example, the flasher-relay unit 26 detects the breaking of the light source 30 in a case where the transmission-line impedance is larger than a predetermined value. In addition, the flasher-relay unit 26 checks whether or not any one of the light sources 30 is broken during the power-supply OFF period.

The vehicular lamp 10 includes a light source block 58, a breaking detection unit 28, an output transmission unit 202, a resistor 302, a capacitor 304, an impedance changing unit 204 and a diode 314.

In this example, the output transmission unit 202 supplies a value based on the breaking information received from the breaking detection unit 28, to the capacitor 304 via the resistor 302. Except for this point, the light source block 58, the breaking detection unit 28 and the output transmission unit 202 have the same or similar functions as/to those of the light source block 58, the breaking detection unit 28 and the output transmission unit 202 in FIG. 6A. Therefore, the description thereof is omitted.

The capacitor 304 is grounded at an end other than the end that receives the output of the output transmission unit 202, and holds a value received from the output transmission unit 202 during the power-supply OFF period. During the power-supply ON period, the capacitor 304 is charged in a case where the breaking is not detected, while being discharged when the breaking has been detected. In this manner, the capacitor 304 holds a value indicating whether or not the breaking detection unit 28 detected the breaking, during the power-supply OFF period. Please note the capacitor 304 has a capacitance of several tens to several hundreds of microfarads, for example. In this case, the capacitor 304 can hold the value of the signal received from the impedance changing unit 204 for about 0.1 to 1 sec. Moreover, the capacitor 304 gives the thus held value to the impedance changing unit 204 during the power-supply OFF period.

The impedance changing unit 204 includes an NPN transistor 216, a resistor 222, a resistor 214, a resistor 218, a resistor 220, an NPN transistor 306, a resistor 308 and a diode 312. The NPN transistor 216 and the resistors 222, 214, 218 and 220 have the same or similar functions as/to those of the NPN transistor 216 and the resistors 222, 214, 218 and 220 and therefore the description thereof is omitted. The resistor 308 has a smaller resistance value than the resistor 222 in this example.

The NPN transistor 306 is electrically connected to the collector terminal of the NPN transistor 206 at its base terminal; is electrically connected to the terminal 34 via the resistor 308 at its collector terminal; and is grounded at its emitter terminal. Thus, during the power-supply OFF period, the NPN transistor 306 is turned off in a case where the breaking has been detected and is turned on in a case where no breaking has been detected. In this manner, the NPN transistor 306 allows the transmission-line current to flow in the resistor 308 in the case where no breaking has been detected.

Therefore, during the power-supply OFF period, the impedance changing unit 204 allows the transmission-line current to flow in the resistor 222 in the case where the breaking has been detected and allows the transmission-line to flow in the resistor 308 in the case where no breaking has been detected. In this manner, the impedance changing unit 204 changes the transmission-line impedance to a larger value in the case where the breaking has been detected. That is, during the power-supply OFF period, the impedance changing unit 204 in the case where the breaking has been detected changes the impedance between the power transmission lines to a larger value based on the value held by the capacitor 304.

During the power-supply ON period, the flasher-relay unit 26 applies a power-supply ON voltage based on forward bias voltages in the respective light sources 30 across the light source block 58. On the other hand, during the power-supply OFF period, the flasher-relay unit 26 applies a voltage for measurement that is lower than the power-supply ON voltage between the terminals 34 and 38 so as to measure the impedance of the vehicular lamp 10.

In this case, the light source 30 does not allow a current to flow therethrough during the power-supply OFF period because the light source 30 is a light-emitting diode. Thus, the flasher-relay unit 26 can appropriately detect the change of the transmission-line impedance changed by the impedance changing unit 204. According to this example, the breaking detection unit 28 can notify the flasher-relay unit 26 of the information indicating the breaking by making the impedance changing unit 204 change the transmission-line impedance.

Moreover, in this example, the impedance changing unit 204 keeps the impedance between the power transmission lines lower in a case where no breaking has been detected and changes that impedance to a larger value. Thus, according to this example, it is possible to use as the flasher-relay unit 26 a relay unit having the same or similar function as/to that of a relay unit that supplies power to a filament bulb light source, for example. In this case, the vehicular lamp 10 can be driven by the relay unit that is in wide spread use.

The diodes 312 and 314 are diodes for protecting the vehicular lamp 10 from connection in the reverse direction. In a case where the input of the vehicular lamp 10 is connected in the reverse direction to the flasher-relay unit 26, the diode 312 supplies a current received from the terminal 38, to the terminal 34 via the resistor 222. At this time, the diode 314 blocks a current flowing in the light source 30 in the reverse direction so as to protect the light source 30.

Figure 12:
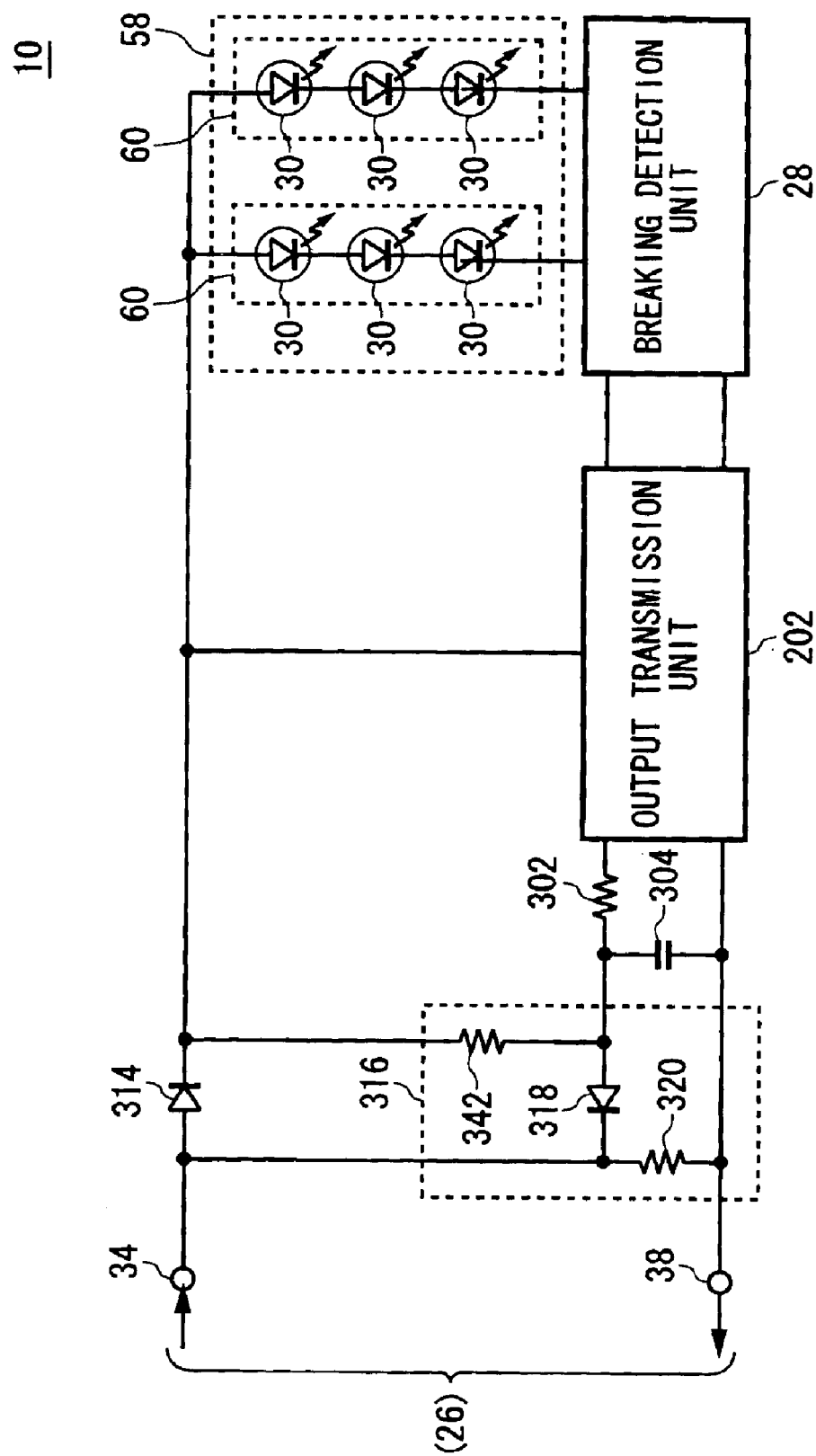
FIG. 12 shows still another exemplary circuit structure of the vehicular lamp.

FIG. 12 shows still another exemplary circuit structure of the vehicular lamp 10. In FIG. 12, the components labeled with the same reference numerals as those in FIG. 11 have the same or similar functions as/to the components in FIG. 11 and therefore the description thereof is omitted.

In this example, the vehicular lamp 10 receives power from a flasher-relay unit 26 having a function of measuring a potential at the terminal 34 during the power-supply OFF period, in place of the flasher-relay unit 26 described referring to FIG. 11. As such a circuit for measuring the potential, various types of circuit are known. Therefore, the description of such a circuit is omitted. In this example, the flasher-relay unit 26 detects the breaking of the light source 30 in a case where the measured potential at the terminal 34 is smaller than a predetermined value. In this manner, the flasher-relay unit 26 checks the presence or absence of breaking of the light source 30 during the power-supply OFF period.

In this example, the vehicular lamp 10 includes a held value outputting unit 316 in place of the impedance changing unit 204. The held value outputting unit 316 includes a resistor 342, a resistor 320 and a diode 318. The resistor 342 is a pull-up resistor electrically connected to the cathode of the diode 314 at one end. The other end of the resistor 342 is electrically connected to the terminal 34. The resistor 320 connects the cathode of the diode 318 to the ground. The diode 318 is connected to the output transmission unit 202 via the resistor 302 at its anode, and is electrically connected to the terminal 34 at its cathode.

During the power-supply OFF period, since the capacitor 304 is charged in a case where the breaking has been detected, the capacitor 304 biases the diode 318 in the forward direction. Thus, the diode 318 causes a current to flow in the resistor 320, so as to make the potential at the terminal 34 rise. Also, the held value outputting unit 316 outputs a higher potential corresponding to the value held by the capacitor 304 to the terminal 34.

On the other hand, in a case where no breaking has been detected, since the capacitor 304 is discharged, the capacitor 304 biases the diode 318 in the reverse direction. Thus, the current flowing in the diode 318 is substantially zero and therefore the potential at the terminal 34 does not increase. Thus, the held value outputting unit 316 outputs a lower potential corresponding to the value held by the capacitor 304 to the terminal 34. According to this example the breaking detection unit 28 can notify the flasher-relay unit 26 of the information indicating the breaking by making the held value outputting unit 316 output the value held by the capacitor 304.

Figure 13:
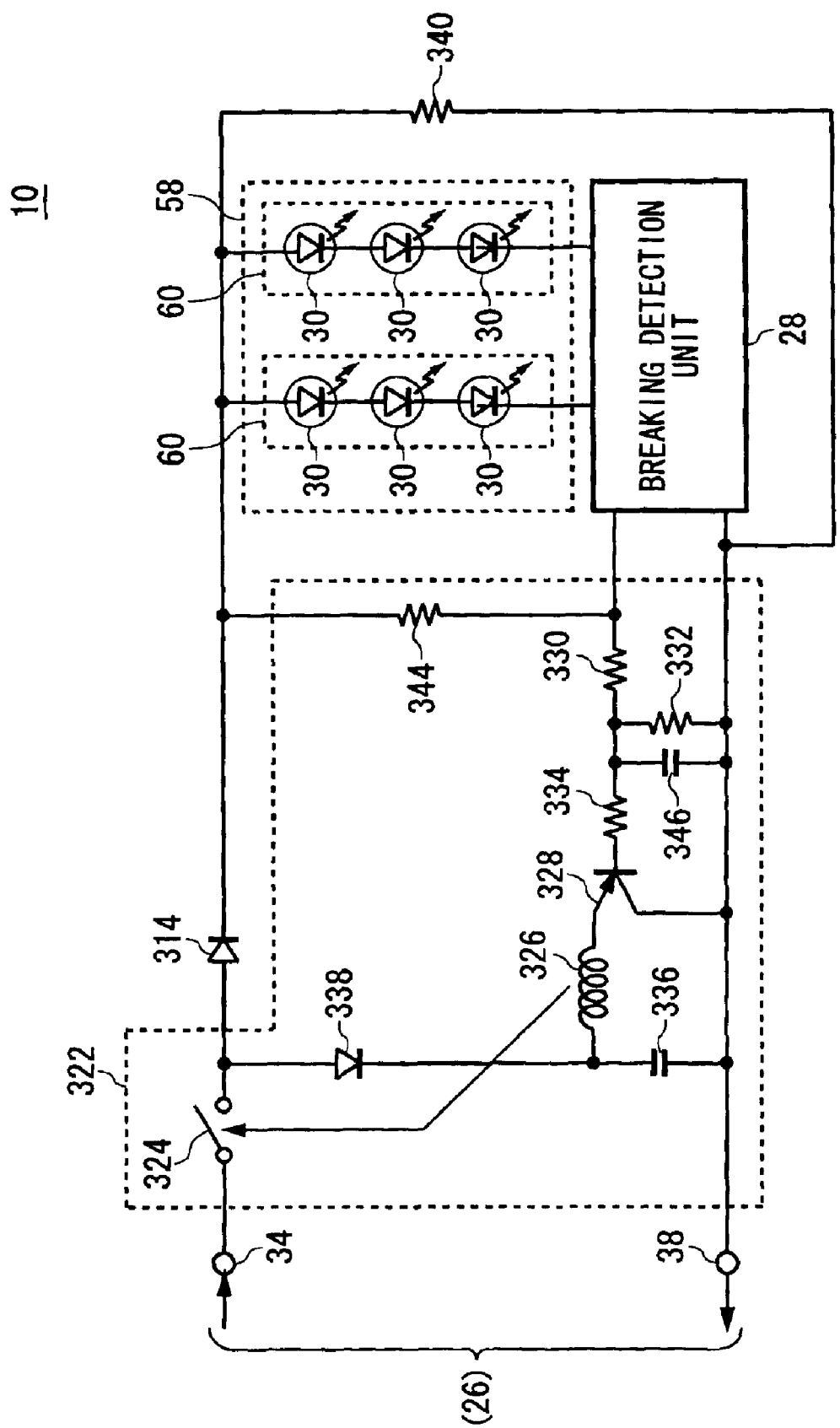
FIG. 13 shows still another exemplary circuit structure of the vehicular lamp.

FIG. 13 shows still another example of the circuit structure of the vehicular lamp 10. In FIG. 13, the components labeled with the same reference numerals as those in FIG. 11 have the same or similar functions as/to the components in FIG. 11 and therefore the description thereof is omitted. In this example, the vehicular lamp 10 receives power from a flasher-relay unit 26 having the same or similar function as/to that of the flasher-relay unit 26 described referring to FIG. 11.

The vehicular lamp 10 includes a resistor 340 and a switching unit 322, in place of the impedance changing unit 204, the resistor 302 and the capacitor 304. The resistor 340 is connected to the light source block 58 and the breaking detection unit 28 in parallel thereto and electrically connects the terminals 34 and 38 to each other.

The switching unit 322 includes a capacitor 346, a resistor 330, a resistor 344, a resistor 332, a PNP transistor 328, a resistor 334, a capacitor 336, a relay coil 326, a relay switch 324 and a diode 338.

The relay coil 326 and relay switch 324 form a relay. The relay coil 326 is a coil connected in series with the PNP transistor 328 and controls the relay switch 324. The relay switch 324 is provided between the terminal 34 and the diode 314, and is turned on or off in accordance with a current flowing in the relay coil 326. In this example, the relay switch 324 is turned off when the current flows through the relay coil 326.

During the power-supply ON period, the capacitor 346 is charged in a case where no breaking has been detected and is discharged in a case where the breaking has been detected. In this manner, the capacitor 346 stores a value output from the breaking detection unit 28 and holds it during the power-supply OFF period. The resistors 344, 330 and 332 supply a voltage obtained by dividing a positive voltage output from the flasher-relay unit 26 by a resistance ratio of these resistors to the capacitor 346 in a case where no breaking has been detected.

The capacitor 336 is electrically connected to the terminal 34 during the power-supply ON period so as to be charged by a voltage that the terminal 34 receives from the flasher-relay unit 26. Then, during the power-supply OFF period, the capacitor 336 supplies the thus charged voltage to the relay coil 326.

The PNP transistor 328 receives the value held by the capacitor 346 via the resistor 334 at its base terminal. Thus, during the power-supply OFF period, the PNP transistor 328 is turned on in a case where the breaking has been detected while being turned off in a case where no breaking has been detected. In this manner, the PNP transistor 328 allows a current from the capacitor 336 to flow in the relay coil 326 in the case where the breaking has been detected during the power-supply OFF period. In this case, the relay switch 324 is turned off, the terminals 34 and 36 are electrically disconnected, and the impedance of the vehicular lamp 10 becomes larger. The relay coil 326 may receive a current from the terminal 34 in place of the capacitor 336 so as to allow the received current to flow.

On the other hand, in a case where no breaking has been detected, the relay switch 324 is turned on. Thus, the impedance of the vehicular lamp 10 is small. Therefore, according to this example, it is possible to check the presence or absence of breaking of the light source 30 by measuring the impedance between the terminals 34 and 38 during the power-supply OFF period. According to this example, the breaking detection unit 28 can notify the flasher-relay unit 26 of the information indicating the breaking by controlling the switching unit 322.

As is apparent from the above, according to the present invention, breaking of a light-emitting diode included in a vehicular lamp can be detected appropriately.

Although the present invention has been described by way of exemplary embodiments, it should be understood that those skilled in the art might make many changes and substitutions without departing from the spirit and the scope of the present invention which is defined only by the appended claims.

What is claimed is:

1. A vehicular lamp used in a vehicle, comprising:
   a light source including a light-emitting diode operable to emit light in accordance with power received from a power supply provided in an outside of said vehicular lamp;
   a lamp body operable to accommodate said light source therein to protect said light source from water;
   a breaking detection unit operable to detect breaking of said light source and notify an outside of said lamp body of the detection result;
   an impedance changing unit operable to change impedance between two power transmission lines for transmitting said power to said light source in a case where said breaking detection unit detected said breaking, wherein
   said breaking detection unit notifies the outside of said lamp body of information indicating said breaking by making said impedance changing unit change said impedance.

2. A vehicular lamp as claimed in claim 1, wherein a plurality of light sources connected in parallel are provided, and
   said breaking detection unit detects said breaking in a case where at least one of said plurality of light sources was broken.

3. A vehicular lamp as claimed in claim 2, wherein said breaking detection unit notifies the outside of said lamp body of information indicating said breaking via a breaking information notifying line that is electrically independent of a power transmission line for transmitting said power to said light sources.

4. A vehicular lamp as claimed in claim 1, wherein said impedance changing unit includes:
   a switch connected in parallel to said light source; and
   a resistor, connected in parallel to said light source and in series with said switch, operable to allow a two power transmission lines to the other power transmission line in a case where said switch is turned on, and
   said breaking detection unit turns said switch on to allow said transmission-line current to flow in said resistor in a case where said breaking detection unit detected said breaking, thereby making said impedance changing unit change said impedance to a smaller value.

5. A vehicular lamp as claimed in claim 4, wherein said light source receives said power that intermits at a predetermined period,
   said breaking detection unit detects said breaking during a time period in which said light source receives said power, and
   said impedance changing unit further includes a limiting capacitor operable to limit a time in which said impedance is smaller than a predetermined value by changing said transmission-line current during said time period in a case where said breaking detection unit detected said breaking.

6. A vehicular lamp used in a vehicle, comprising:
   a light source including a light-emitting diode operable to emit light in accordance with power received from a power supply provided in an outside of said vehicular lamp;
   a lamp body operable to accommodate said light source therein to protect said light source from water;
   a breaking detection unit operable to detect breaking of said light source and notify an outside of said lamp body of the detection result;
   wherein said light source receives said power that intermits at a predetermined period,
   said breaking detection unit detects said breaking during a time period in which said light source receives said power,
   said vehicular lamp further includes a holding capacitor operable to hold a value indicating whether or not said breaking detection unit detected said breaking, during a time period in which said light source receives no power, and
   said breaking detection unit notifies the outside of said lamp body of information indicating said breaking based on said value held by said holding capacitor during said time period in which said light source receives no power.

7. A vehicular lamp as claimed in claim 6, further comprising an impedance changing unit operable to change impedance between two power transmission lines for transmitting said power to said light source, based on said value held by said holding capacitor during said time period in which said light source receives no power, wherein
   said breaking detection unit notifies the outside of said lamp body of said information indicating said breaking by making said impedance changing unit change said impedance.

8. A vehicular lamp as claimed in claim 6, further comprising a held value outputting unit operable to output said value held by said holding capacitor to the outside of said lamp body during said time period in which said light source receives no power, wherein
   said breaking detection unit notifies the outside of said lamp body of said information indicating said breaking by making said held value outputting unit output said value.

9. A vehicular lamp as claimed in claim 6, wherein a plurality of light sources connected in parallel are provided, and
   said breaking detection unit detects said breaking in a case where at least one of said plurality of light sources was broken.

10. A vehicular lamp as claimed in claim 9, wherein said breaking detection unit notifies the outside of said lamp body of information indicating said breaking via a breaking information notifying line that is electrically independent of a power transmission line for transmitting said power to said light sources.

* * * * *